United States Patent [19]

Teraoka

[11] 4,423,000
[45] Dec. 27, 1983

[54] METHOD FOR MOLDING HOLLOW PLASTIC ARTICLES

[76] Inventor: Syoichi Teraoka, 3767-2, Kamura-cho, Fukuyama-shi, Hiroshima-Ken, Japan

[21] Appl. No.: 282,704

[22] Filed: Jul. 13, 1981

[30] Foreign Application Priority Data

Oct. 17, 1980 [JP] Japan .................................. 55-145964
Mar. 20, 1981 [JP] Japan .................................. 56-40995
Mar. 25, 1981 [JP] Japan .................................. 56-44344

[51] Int. Cl.$^3$ ...................... B29C 17/04; B29C 17/07
[52] U.S. Cl. .................................... 264/524; 264/521;
264/522; 264/526; 264/529; 264/545; 264/547;
425/504; 425/525; 425/388
[58] Field of Search ............... 264/524, 526, 545, 521,
264/522, 529, 547; 425/DIG. 48, 504, 525, 532,
522, 388

[56] References Cited

U.S. PATENT DOCUMENTS

| | | | |
|---|---|---|---|
| 3,099,043 | 7/1963 | Held, Jr. .............................. | 264/545 |
| 3,235,638 | 2/1966 | Winstead ............................. | 264/545 |
| 3,242,245 | 3/1966 | Greig et al. ......................... | 264/545 |
| 3,334,164 | 8/1967 | Samuels et al. ..................... | 264/526 |
| 3,444,034 | 5/1969 | Hewett .............................. | 264/545 X |
| 3,452,125 | 6/1969 | Schurman et al. .................. | 264/526 X |
| 3,548,043 | 12/1970 | Held, Jr. ............................. | 264/545 |

Primary Examiner—Jan H. Silbaugh
Attorney, Agent, or Firm—Sherman & Shalloway

[57] ABSTRACT

A method for producing a hollow synthetic resin article, which comprises opening a split mold having an inner molding surface with a contour conforming to the configuration of the desired article, feeding a heated molding material of a thermoplastic synthetic resin in the form of a tube or two parallel-laid sheets into a space between the opposing mold members of the split mold, applying a negative pressure to vacuum suction holes provided in the molding surfaced and the parting surfaces of the split mold to vacuum-form the molding material, and while the negative pressure is being applied or after the application of the negative pressure is stopped, closing the mold to form the molding material into the final desired configuration. A hollow synthetic resin article having a general configuration corresponding to two trays joined at their bottoms with a hollow portion formed at their periphery and including at least one non-hollow first portion resulting from joining of the bottoms of the two trays and at least one hollow second portion resulting from joining of the bottoms of the two trays and being isolated from said peripherally located hollow portion may be produced by the above method using a split mold having mold cavities conforming to the above specified configuration.

6 Claims, 16 Drawing Figures

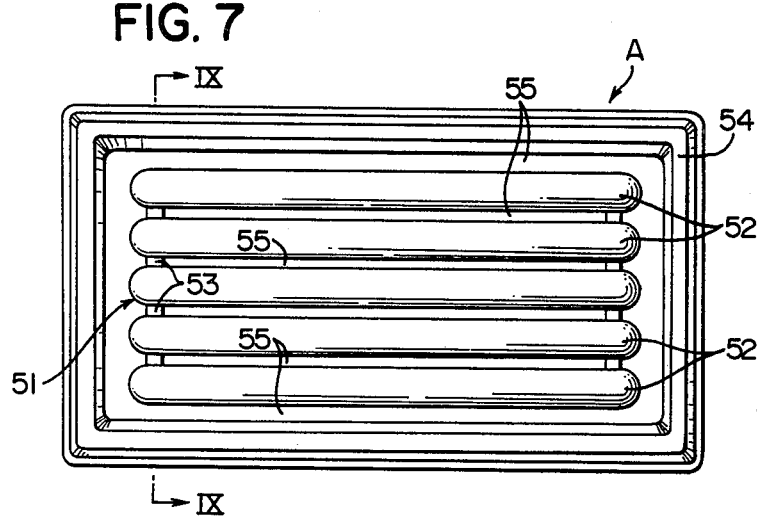
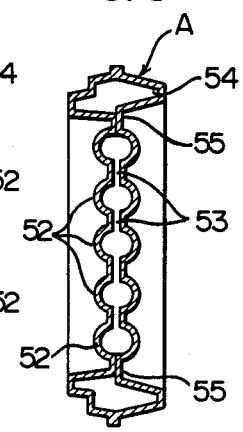
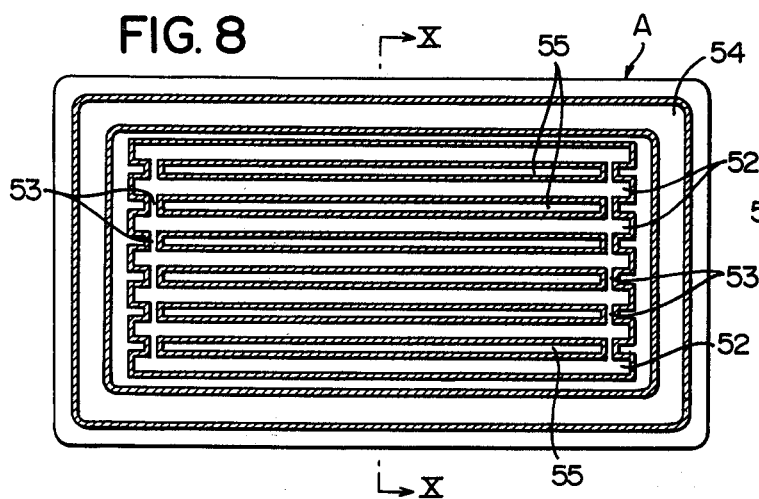
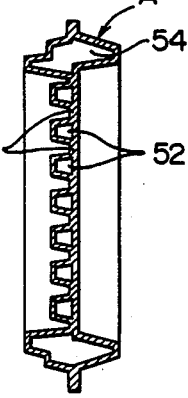
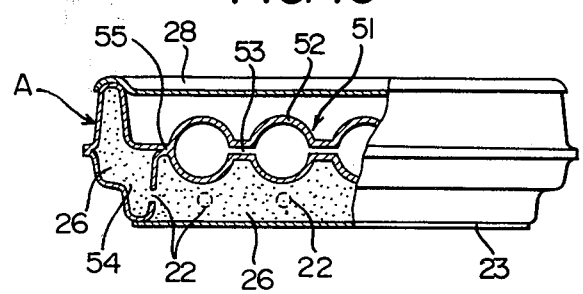

U.S. Patent Dec. 27, 1983 Sheet 4 of 4 4,423,000
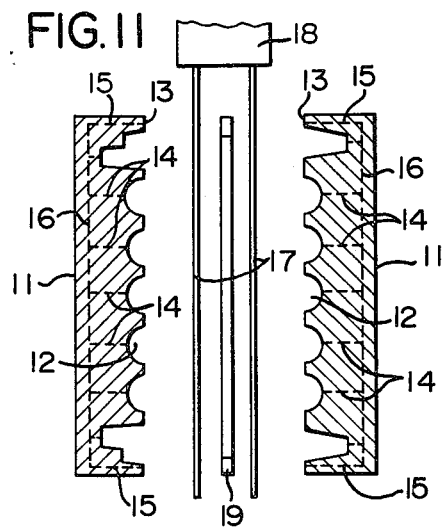
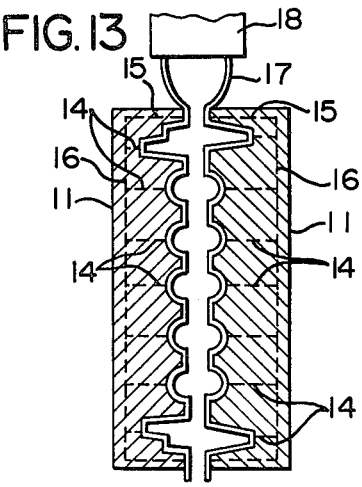
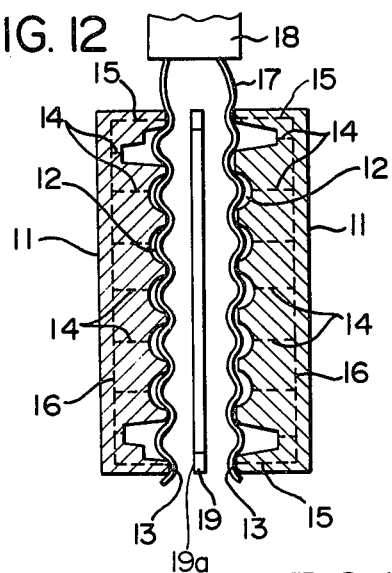
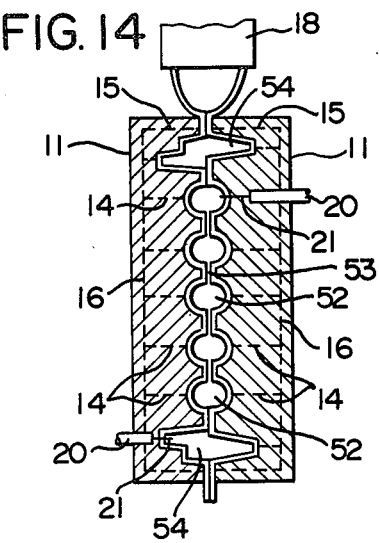
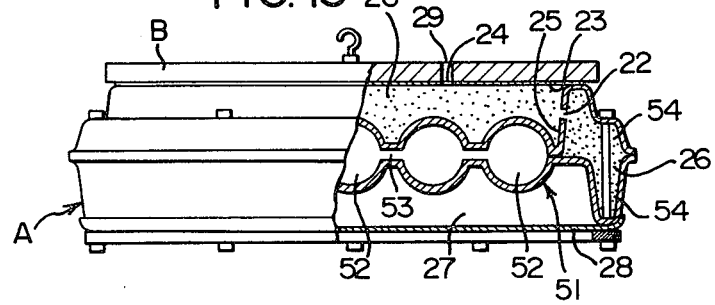

METHOD FOR MOLDING HOLLOW PLASTIC ARTICLES

This invention relates to a method and an apparatus for molding a hollow molded article of a thermoplastic synthetic resin, and more specifically to a method and an apparatus for producing a hollow molded article by a split mold from a heat-softened plastic molding material in the form of a tube or two parallel-laid sheets (such a molding material is generically referred to herein as a parison).

The invention also pertains to a method and an apparatus which can be effectively used in the production of deep-drawn molded articles having raised and depressed surface portions of large height or depth, or hollow molded articles of a complex shape in which the hollow portion is divided into a plurality of sections. Such a hollow molded article of a complex shape is, for example, a collector of a solar heater.

A typical method for molding a hollow article from a parison using a split mold is blow molding. Blow molding, in theory, is a molding method whereby a bag-like molding material is expanded in a closed split mold. According to the blow molding method, the molding material is pinched by the parting surfaces of the split mold and the pinched portion does not stretch. Hence, that portion of the molding material which is adjacent the pinched portion tends to become thinner. This tendency is greater as the molded article has a larger depth or a larger size. When it is desired to mold a depressed article having a hollow double wall structure and a depression, the molding material must be pinched by the entire periphery of the parting surfaces of the split mold. Furthermore, since the peripheral edge portion of the opening of such a molded article adjoins the parting surface of the split mold, this peripheral edge portion has the smallest thickness. Particularly, when the molded article has a deep-down configuration, the aforesaid localized variation in thickness of the molding material incident to expansion during the molding further increases, and the depth of a molded article by such a molding method is considerably restricted.

When a male mold member is used in the production of a molded article having a depression, its molding surface pushes the parison at the time of closing the split mold, or the internal air pressure of the tubular parison causes the peripheral portion of the parison to swell out of the mold, whereby that portion of the parison which gets out of the mold sometimes becomes thin. As a result, molding of the product into the desired shape and configuration is impossible or the product has so small a wall thickness that it cannot be used in practical applications.

As an improvement in the molding of a molded article having a depression and a hollow double wall structure from a molding material by a split mold, there is known a method in which a slidable cylindrical member is provided on the periphery of one mold member, the molding material is enclosed in a restricted space surrounded by the cylindrical member and the other mold member while the split mold is kept open, and then the split mold is closed to perform molding. Such a method is disclosed, for example, in Japanese Patent Publication No. 14152/1971 (corresponding to U.S. Pat. No. 3,736,201, British Pat. No. 1,346,499, and west German Pat. No. 2,137,183). Since according to this method, the molding material is not expanded within the closed split mold but is molded within the above-mentioned restricted space, the local thinning of the parison during blow molding can be prevented and a molded article having a depression of considerable depth can be produced. This prior method, however, additionally requires the cylindrical member for forming a restricted space together with one mold member.

Another conventional improved method for molding a hollow article by using a split mold involves using blow molding and vacuum molding simultaneously by providing vacuum suction holes on the surface of the mold cavities of an ordinary blow mold. This method is disclosed, for example, in Japanese Laid-Open Patent Publication No. 112965/1979 filed by the present inventor. It has been found however that according to this method, it is difficult to produce molded articles containing a plurality of closed hollow portions and having a complex configuration.

It is an object of this invention to provide a novel method and apparatus for producing hollow plastic articles, which are free from the aforesaid defects.

According to this invention, deep-drawn hollow plastic articles, for example molded articles having a deep depression and a hollow double wall structure, can be easily molded.

The present invention also makes it possible to produce molded articles having a plurality of closed hollow portions. Such a type of molded article is useful, for example, as a collector portion of a solar heater.

According to this invention, there is first provided a method for producing a hollow synthetic resin article, which comprises opening a split mold having an inner molding surface with a contour conforming to the configuration of the desired article, feeding a heated molding material of thermoplastic synthetic resin in the form of a tube or two parallel-laid sheets (parison) into a space between the opposing mold members of the mold, externally applying a negative pressure successively to vacuum suction holes provided in the molding surface and the parting surfaces of the split mold to vacuum-form the parison, and while the negative pressure is being applied or after the application of the negative pressure is stopped, closing the mold to form the molding material into the final desired configuration while it is kept in contact with the entire molding surface of the mold.

According to another aspect of the invention, there is provided a method for producing a hollow synthetic resin article having a general configuration corresponding to two trays joined at their bottoms with a hollow portion formed at their periphery, said article including at least one non-hollow first portion resulting from joining of the bottoms of the two trays and at least one hollow second portion resulting from joining of the bottoms of the two trays and being isolated from said peripherally located hollow portion; said method comprising:

opening a split mold having mold cavities with a contour conforming to the configuration of the desired article, feeding a heat-softened molding material of thermoplastic synthetic resin in the form of a tube or two parallel-laid sheets (parison) into a space between the opposing mold members of the mold, externally applying a negative pressure successively to vacuum suction holes provided in the mold cavities and parting surfaces of the mold thereby to form the molding material into said tray-like configuration, and while the negative pressure is being applied or after the application of the negative pressure is stopped, closing the split mold to join the two halves of the molding material into a unitary molded structure at its peripheral edge portion and at that part of the molding material which corresponds to said at least one first portion of the molded article. According to this method, the molding can be performed within a period of as short as several seconds.

According to this invention, there is also provided a molding apparatus for use in the practice of the molding method of the invention, said apparatus comprising a split mold having an inner molding surface with a contour conforming to the configuration of the desired article and consisting of opposing mold members which when the split mold is open, are adapted to receive in a space between them a heated molding material of thermoplastic synthetic resin in the form of a tube or two parallel-laid sheets, said split mold having vacuum suction holes provided in its inner molding surface and parting surfaces.

The invention further provides a molding apparatus for producing a hollow synthetic resin article having a general configuration corresponding to two trays joined at their bottoms with a hollow portion formed at their periphery said article including at least one non-hollow first portion resulting from joining of the bottoms of the two trays and at least one hollow second portion resulting from joining of the bottoms of the two trays and being isolated from said peripherally located hollow portion, said apparatus comprising a split mold having mold cavities with a contour conforming to the configuration of the desired article and consisting of opposing mold members which when the split mold is opened, are adapted to receive in a space between them a heated molding material of thermoplastic synthetic resin in the form of a tube or two parallel-laid sheets, said split mold having vacuum suction holes provided in its mold cavities and parting surfaces.

The molding method of the invention is carried out in the manner shown below when the split mold consists of two female mold mambers. A parison is fed into a space between the two opposing mold members while the split mold is open. Then, the split mold members are slightly moved toward each other to bring the parting surfaces of the mold into slight contact with the outside surface of the parison. By applying a negative pressure to the vacuum suction holes in the parting surfaces, those portions of the parison which abut against the parting surfaces are attracted to the parting surfaces whereby a closed space is formed by the parison and the mold cavities. Thus, owing to the negative pressure applied to the suction holes of the molding surface, the parison is attracted toward the mold cavities, and conforms substantially to the configuration of the mold cavities. In this condition, the parison is vacuum-molded.

Then, the split mold is closed to join the two halves of the parison into a unitary molded structure at that part of the molded article which corresponds to the parting surfaces of the mold. Desirably, suction from the suction holes is continued when the mold is closed. But if desired the mold may be closed after this sucking operation is stopped. The molding may be facilitated by injecting pressurized air into the hollow portion of the molded article by a suitable method known per se, for example by using a syringe, while the split mold is closed. The above molding cycle is preferably as short as possible because if the molding takes a long period of time, the parison will be cooled and become difficult to mold.

Thus, according to this invention, when the two mold members are female molds, the closing of the molding surface of the mold member, which is required for molding of a parison, is effected by the attaching of the parison to the vacuum suction holes provided in the parting surfaces of the mold. Accordingly, that part of the parison which is to be restrained (i.e., that part of the parison which does not stretch during the molding) is not a part which corresponds to the entire parting surfaces of the split mold but a part which corresponds to a continuous or linear part extending along the vacuum suction holes. Thus, that part of the molding material which corresponds to the parting surfaces of the mold inwardly of the above vacuum suction holes is drawn toward the cavities during the molding. As a result, the tendency of that part of the molding material which adjoins the parting surfaces of the split mold to become thin is eliminated or markedly reduced. As will be described in detail hereinbelow, the positions of the vacuum suction holes in the parting surfaces surrounding the cavity are determined desirably depending upon the depth of the cavity.

When the split mold consists of a female mold member and a male mold plug, the molding method of the invention is carried out in the following manner. First, a negative pressure is applied to the vacuum suction holes in the molding surface and the vacuum suction holes in the parting surfaces of the mold, and the female mold member and the male mold plug are moved toward the parison. The molding of the parison at the female mold is done as described above. In the meantime, by the forward movement of the male mold plug, the parison is roughly molded into a [shape in the early molding stage as in the case of drawing. Then, the outside surface of the [-shaped portion of the parison makes contact with the peripheral portions of the parting surfaces, and is attracted to the parting surfaces by the negative pressure applied to the suction holes in the parting surfaces to form a closed space. Then, the parison is vacuum-molded into a shape conforming to the molding surface of the male mold member. In this case, too, that part of the parison which is contiguous to the parting surface of the split mold is attracted not to the entire parting surface but to the vacuum suction holes provided at given intervals along the periphery of the parting surfaces. Thus, since this part is restrained by a continous or linear part along the suction holes, the tendency of this part to become thin on the cavity side can be markedly reduced.

While the sucking operation is continued or after the sucking operation is stopped, the female mold member and the male mold member plug are closed thereby to convert the molding material into a unitary molded structure at that part which corresponds to the parting surfaces of the mold. The molding may be facilitated by injecting pressurized air into the interior of the molded article in the closed split mold by the same method as stated hereinabove. By this operation, a molded article having fine raised and depressed portions, small letters, grain patterns, etc. can be molded precisely and faithfully according to the molding surface of the mold, and the gloss of the molded article is also increased.

Thus, according to this invention, the localized reduction in wall thickness in blow molding can be eliminated or markedly reduced. The present invention therefor has the advantage that not only hollow molded articles of deep-drawn configurations but also hollow articles having a deep-drawn concave shape with the depth-to-width ratio of 1:1, the latter being unable to be molded heretofore by blow molding, can be produced from molding material by vacuum press molding using a split mold. Moreover, this can be achieved without the need for a holding member such as the cylinder for closing the circumferential part of the split mold.

The vacuum suction holes on the parting surfaces of the split mold in this invention may be located on that part of the parting surfaces which is near the molding surface of the split mold when the molded article desired is of a shallow-drawn configuration. In the case of producing molded articles of a deep-drawn configuration, these holes are arranged preferably near the periphery of the parting surfaces.

According to one embodiment of the present invention, the parison supplied to the space between the open mold members is molded into the configuration of a tray by the split mold members by producing vacuum both in the parting surfaces and the mold cavities of the mold through vacuum suction holes provided therein. In this case, vacuum suction holes are provided along the periphery of the parting surfaces of the mold. By the sucking action through these suction holes, those parts of the parison which correspond to the parting surfaces of the mold are drawn toward, and attached to, the parting surfaces, and then the mold cavities of the split mold are sealed up. In other words, according to this invention, the sealing of the mold cavities, which is required for vacuum molding of the molding material, can be simply effected by utilizing the molding material without the need to close the mold members or to use the additional sealing device as shown in the prior art.

By closing the split mold, the peripheral edge portion of the molding material in the configuration of a tray and that part of the molding material which corresponds to the first portion are joined into a unitary structure and assumes the desired hollow configuration. Since at the time of closing the mold the molding material has the configuration of a tray, it is never caused to bulge out of the mold by being pushed by the raised portion of the mold even when the molding material is initially a bag-like parison.

Thus, according to the above-method, molded articles of a special hollow configuration, especially molded articles having a plurality of hollow portions therein, for example those suitable as a solar heat collector, can be simply and surely molded from a parison by a vacuum press forming technique using a split mold.

Furthermore, the closing of the mold cavities, which is required for vacuum molding of a parison is effected by the attachment of the parison to the vacuum suction holes formed in the parting surfaces of the mold. Accordingly, that part of the parison which is to be restrained by the sucking action (i.e., that part of the parison which does not stretch during the molding) is not a part which corresponds to the entire parting surface of the split mold but a part which corresponds to a continuous or linear part extending along the vacuum suction holes. Accordingly, the tendency of that part of the parison which adjoins the parting surfaces of the split mold to become thinner than the other parts can be eliminated or markedly reduced as a result of being drawn toward the molding cavities during the molding.

The hollow molded article obtained in this manner can be used as a solar heat collector of water heaters.

The molding method of the invention can be suitably used for the molding of thermoplastic synthetic resins such as medium-pressure polyethylene, polypropylene, and ABS resins. Such a plastic molding material may be molded in a sheet form, etc. by an extruder, and then supplied as such to the split mold in accordance with this invention. Or a sheet-like material which is cooled may be heated while being held between two frames, and then supplied to the mold.

The preferred embodiments of the invention are described in more detail below with reference to the accompanying drawings in which:

FIG. 7 is a top plan view showing one example of a molded article produced by the invention;

FIG. 8 is a top plan view in section showing another example of a molded article produced by the invention;

FIG. 9 is a sectional view taken along the line III—III of FIG. 7;

FIG. 10 is a sectional view taken along the line IV—IV of FIG. 8;

FIGS. 11 to 14 are sectional views showing another embodiment of the molding method of the invention;

FIG. 15 is a partial longitudinal sectional view showing a method for producing a body of a solar heater from the molded article in accordance with this invention; and FIG. 16 is a partly-broken-away front elevation showing one example of a solar heater built by using a molded article obtained by the method of the invention.

Figure 1:
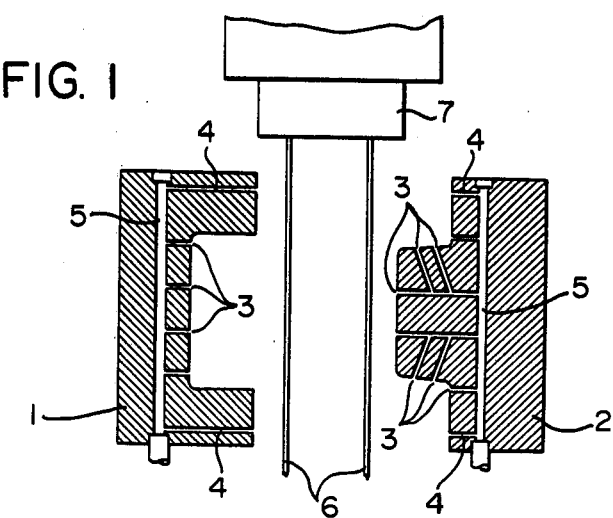
FIGS. 1, 2 and 3 are front sectional views showing one embodiment of the molding method of the invention.
Figure 2:
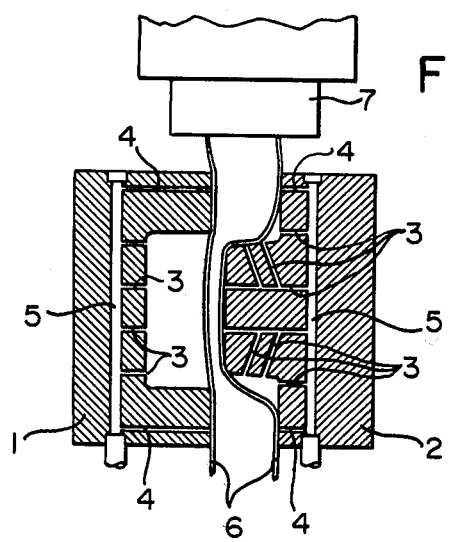
Figure 3:
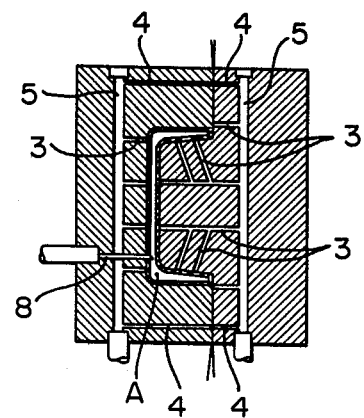

In the embodiments shown in FIGS. 1 to 6, a split mold composed of a female mold member 1 and a male mold plug 2 is employed. An embodiment wherein a split mold composed of two female mold members will be obvious to those skilled in the art from the following description of the embodiments shown in FIGS. 1 to 6.

In each of the female mold member 1 and the male mold plug 2, vacuum suction holes 3 are provided on the molding surface and vacuum suction holes 4 are provided on the parting surfaces of the mold. The suction holes 4 on the parting surfaces are arranged near the periphery of the parting surfaces when the desired molded article is of a deep drawn configuration (see FIG. 4). When the desired molded article is of a shallow-drawn configuration, the suction holes 4 may be arranged at that part of the parting surface which is near the molding surface (see FIG. 5). The vacuum suction holes 3 and 4 are connected to a vacuum source (not shown) through holes 5.

Figure 4:
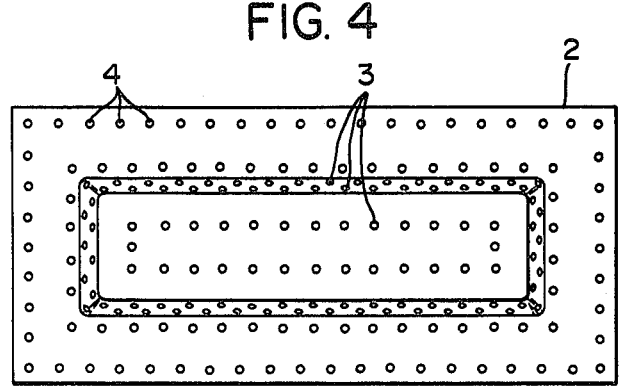
FIGS. 4 and 5 are side elevations showing examples of the arrangement of vacuum suction holes in the molding apparatus of the invention.
Figure 5:
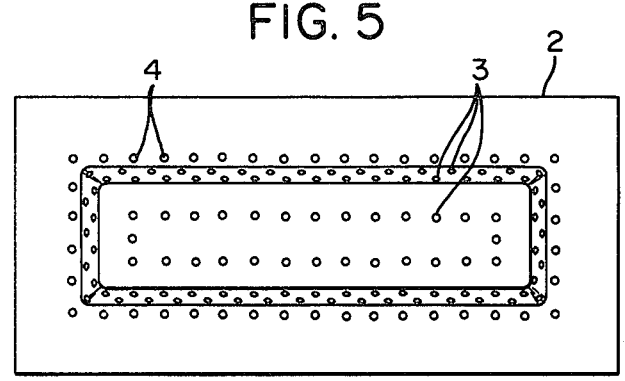
Figure 6:
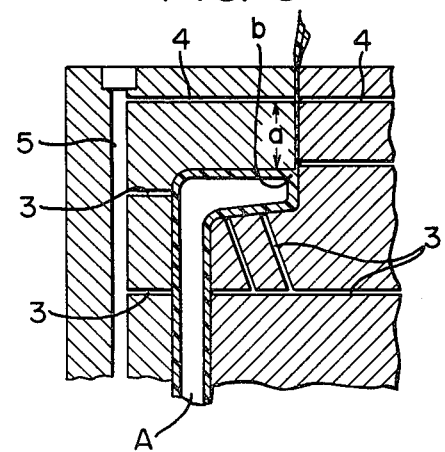
FIG. 6 is an enlarged sectional view showing a part of FIG. 3.

In operation, the female mold member 1 and the male mold plug 2 are opened, and a parison 6 of a thermoplastic resin such as polypropylene is fed into the space between the mold members 1 and 2 from a die 7 of an extruder located above the split mold (see FIG. 1). The parison is of such a size that its width in the left-right direction of the mold in FIGS. 4 and 5 is slightly larger than the width in the same direction of the female mold member 1 and the male mold plug 2.

The female mold member 1 and the male mold plug 2 are moved toward the parison 6, and a vacuum pressure is applied to the holes 3 and 4 through the holes 5. Thus, in the initial stage, the parison 6 makes contact with the parting surfaces of the female mold member 1 and the male mold plug 2 to form a closed zone (see FIG. 2). Then, the parison is vacuum-molded into a configuration conforming to the configuration of the raised molding surface of the male mold plug 2. In the meantime, that part of the parison which makes contact with the molding surface of the female mold member 1 is vacuum-molded into a configuration conforming to the configuration of the molding surface of the female mold member 1. Finally, the female mold member 1 and the male mold plug 2 are completely closed whereby the parison is formed into an integral structure by being joined at those parts which correspond to the parting surfaces of the mold. Thus, a hollow molded article A having a final dual structure is obtained (see FIG. 3).

During the vacuum molding by means of the female mold member 1 and the male mold plug 2, the part a of the parison 6 which is between the vacuum suction holes 4 on the parting surface and the edge of the molding surface (see FIG. 6) is drawn toward the molding surface. As a result, thinning of the part b of the molded article A which is contiguous to the molding surface is eliminated or markedly reduced.

When a molded article A having a grain pattern, a fine raised and depressed pattern, or fine letters is to be produced by using a mold cavity having such a pattern, the molding operation may be facilitated by injecting pressurized air under a pressure of, for example, about 5 to 10 kg/cm$^2$ into the hollow portion of the molded article A within the closed split mold by using syringe-type injecting pipe 8. When an ABS resin, for example, is used as a molding material, the carved pattern on the molding surfaces can be very precisely reproduced on the surface of the molded article A by this air injection. Thus, when coating is done, an article having a mirror-like glossy surface can be easily obtained.

Now, referring to FIGS. 7 to 14, an embodiment of molding a hollow plastic article suitable for use as a component part of a solar heater is described.

The molded article A shown in FIG. 7 is a one-piece article consisting of a heat collecting section 51 for absorbing solar radiation composed of parallel-aligned tubular portions 52 and a connecting tubular portion 53 for connecting the tubular portions 52 in a communicating relation, and a hollow wall section 54 located around, and outwardly of, the heat collecting section 51. This molded article is produced by juxtaposing two synthetic resin plates, molding them into a predetermined tray-like configuration, forming a hollow section 54 around the molded article, joining the bottoms of the two trays at predetermined parts inwardly of the hollow section 54 to form non-hollow portions 55 (first portions), and joining the bottoms of the two trays at predetermined parts to form hollow portions 52 and 53 (second portions).

The molded article A shown in FIGS. 8 and 10 is the same as the molded article shown in FIGS. 7 and 9 except that the tubular section 52 has a nearly trapezoidal cross-section. This molded article can also be a component part of a solar heater.

A solar heater built by using the molded article A shown in FIGS. 7 and 9 is depicted in FIG. 16.

In FIG. 16, the molded article A is made of polypropylene, for example. The heat collector 51 has an inlet pipe and an outlet pipe (both of which are not shown) through which a heat transfer medium, preferably water, is passed. The hollow section 54 formed outwardly of the collector 51 through the non-hollow section 55 form an outside wall of the solar collector. A lid plate 28 is secured to the top end of the outside wall of the collector. Desirably, the lid plate 28 is made of a material having a high light transmittance with respect to solar radiation, such as a methyl methacrylate resin or polycarbonate in plate form. A bottom plate 23 is provided at the lower end of the outside wall of the collector. A heat insulating material 26 made, for example, of foamed polyurethane is filled in the hollow section 54 of the outside wall and in the space defined by the collector, the outside wall and the bottom plate. Filling of the heat insulating material into the hollow section 54 is effected through a hole 22. In order to increase the efficiency of absorption of heat radiation, the collector 51 is wholly colored black. Or the lower half of the collector is colored black, and its upper half is rendered transparent.

In the embodiment shown in FIGS. 11 to 14, split mold members 11 are provided horizontally in opposing positions. The mold members 11 include mold cavities 12 having a configuration corresponding to the tray of the above-described configuration. The mold cavities shown in FIGS. 11 to 14 have a contour corresponding to the molded article shown in FIGS. 7 and 9. The split molds shown in these drawings are adapted to be opened or closed by a method known per se.

Vacuum suction holes 14 are provided in the mold cavities, and vacuum suction holes 15 are provided on the parting surfaces 13. The holes 14 may be aligned at suitable intervales in a direction corresponding to the longitudinal direction of the tubular hollow section 52. The holes 15 may be aligned at suitable intervals along the periphery of the parting surfaces 13. The holes 14 and 15 are caused to communicate with each other through holes 16 formed in the split mold 11. The holes 16 are connected to a vacuum source, for example a vacuum pump (not shown).

In producing the molded article A, the split mold is opened by a known method. A parison 17 consisting of two sheets is fed into the space between the mold members 11 (see FIG. 11). The parison has such a size that its width in a direction corresponding to the left-right direction of the molded article (A) in FIG. 7 is slightly larger than the width of the split mold member 11 in the same direction. Feeding of the parison into the space between the split mold members 11 may be performed by a method known per se, for example by the same methods as used in a hot parison process, a cold parison process or a sheet parison process. In the illustrated embodiment, the parison is directly extruded into the aforesaid space from a die 18 of an extruder located above the space between the split mold members 11.

When the parison 17 is a parison composed of two parallel-laid sheets or a tubular parison with an open end at the bottom, there may be provided, as required, an air blower 19 for blowing hot compressed air toward the parting surfaces 13 at the periphery of the split mold member 11. The air blower 19 is of a frame-like shape and has a blow opening 19a for blowing hot compressed air against that part of the parison which corresponds to the parting surface 13. The air blower 19 is adapted to be raised to a position corresponding to the height of the parting surface 13 and lowered to a position outside the space between the mold members 11 by a lifting means (not shown).

In operation, the mold members 11 are moved toward the parison 17, and a vacuum pressure is applied to the holes 14 and 15 through the holes 16. As a result, the parison is attached to the parting surfaces 13 of the mold members 11, and the mold cavities 12 of the split mold are sealed by the attachment of the parison 17 (see FIG. 12). If the parison 17 is of a shape having an open bottom, this sealing can be facilitated by raising the air blower to a predetermined position and blowing hot compressed air against the parison simultaneously with the attachment of the parison to the parting surface 13 by vacuum. This serves to increase the molding speed.

When the sealing of the mold cavities 12 is completed, the suction force of the holes 14 act effectively and the parison is attracted to the inner wall surfaces of the mold cavities 12. Thus, the parison is vacuum-molded (see FIG. 13).

Next, the split mold members 11 are closed. When the air blower 19 is used, it is lowered to a position outside the space between the split mold members 11 prior to the closing of the mold. By the closing of the molds members 11, the peripheral portions of the molded article on the mold members and those parts of the molded article which correspond to the first portions 55 are joined to form a non-hollow portion. Thus, a molded article having the hollow portions 52 and 53 is formed (see FIG. 14).

As required, the molding of the hollow portions 52 and 53 may be facilitated by blowing air into the hollow portions 52 and 53 of the molded article in the closed mold.

Blowing of air may be performed by using a syringe-type air blowing pipe. The air blowing pipe is shown at 20 in FIG. 14. The air blowing pipe 20 is provided in the mold member 11 and is adapted to be moved back and forth. When the parison 17 is being vacuum-molded, the air blowing pipe 20 is moved back to a position where its needle tube 21 does not project into the mold cavity 12. When blowing air, it is inserted into the hollow portions 54 and 52 of the molded article.

The molded article is removed from the split mold members 11 in a customary manner.

A collector-equipped box structure of a solar heater can be produced from the molded article A. A specific example of building the collector-equipped box structure is described below with reference to FIG. 15.

A hole 22 is provided at a suitable position of the inward wall of the hollow portion 54 of one tray-like section of the molded article A. The molded article A is fitted in a wooden mold (not shown) or the like, and placed nearly horizontally so that the tray-like section having the hole 22 is located upward. A bottom plate 23 and a weight plate-type holding plate B are put on the molded article A. Then, a foamable synthetic resin material (e.g., polyurethane) is injected into the upper tray-like section 25 of the molded article A through openings 24 provided in the bottom plate 23 and the holding plate B and expanded therein. When the upper tray-like section 25 and the hollow portion 54 are filled with the resin foam 26, the holding plate B is removed. The bottom plate 23 is bonded integrally to the main body of the collector by the foamed resin. In addition to bonding of the bottom plate 23 by means of the foamed resin, it may also be secured to the main body of the collector by welding or bolting.

A transparent lid plate 28 is secured to the othe tray-like section 27 to seal it.

The hollow second portions 52 and 53 of the molded article form a collector, and a conduit (not shown) is mounted to it for passing a heat transfer medium, such as water, therethrough.

Instead of the weight plate, the holding member B may also be a movable plate of a press machine (not shown).

What we claim is:

1. A method for producing a hollow synthetic resin molded article, which comprises opening a split mold having mold cavities with a contour conforming to the configuration of the desired article, feeding a heated parison of a thermoplastic synthetic resin in the form of a tube or two parallel-laid sheets extruded from a die into a space between the opposing mold members of the split mold, applying negative pressure to vacuum suction holes provided in the cavities of said split mold and the vacuum suction holes provided in parting surfaces surrounding said cavities, the positions of said latter vacuum suction holes relative to said cavities being determined according to the depth of said cavities, simultaneously blowing heated compressed air against the inside surface of that portion of the parison which correponds to said parting surfaces in the direction facing said parting surfaces to facilitate attaching of the parison to said parting surfaces, closing said split mold, while applying said negative pressure, to form the parison into a crude hollow molded article, blowing pressurized air into the hollow portion of said crude molded article with said split mold being kept closed to thereby form the parison into a desired final configuration.

2. A method for producing a hollow synthetic resin molded article having a general configuration corresponding to two trays joined at their bottoms with a hollow portion formed at their periphery, said article including at least one non-hollow first portion resulting from joining of the bottoms of the two trays and at least one hollow second portion resulting from joining of the bottoms of the two trays and being isolated from said peripherally located hollow portion; said method comprising opening a split mold having mold cavities with a contour conforming to said tray-like configuration of the desired article, feeding a heated parison of a thermoplastic synthetic resin in the form of a tube or two parallel-laid sheets extruded from a die into a space between the opposing mold members of the split mold, applying negative pressure to vacuum suction holes provided in the cavities of said split mold and to vacuum suction holes provided in parting surfaces surrounding said cavities, the positions of said latter vacuum suction holes relative to said cavities being determined according to the depth of said cavities, simultaneously blowing heated compressed air against the inside surface of that portion of the parison which corresponds to said parting surfaces in the direction facing said parting surfaces to facilitate attaching of the parison to said parting surfaces, closing said split mold, while applying said negative pressure, to join the parison at its portions corresponding to the periphery and said first portion to thereby form the parison into a crude hollow moleded article, and blowing pressurized air into the hollow portion of said crude molded article with said split mold being kept closed to thereby form the parison into a desired final configuration.

3. The method of claim 1 or 2 wherein the vacuum suction holes on the parting surfaces are arranged near the periphery of the parting surfaces when the desired molded article is of a deep-drawn configuration, and on that part of the parting surfaces which is near the molding surface of the mold when the desired molded article is of a shallow-drawn configuration.

4. The method of claim 2 wherein the hollow synthetic resin article is a one-piece molded structure consisting of a heat collecting section of a solar heater and a peripheral wall section surrounding the collecting section.

5. The method of claim 4 wherein the heat collecting section of the solar heater consists of a plurality of parallel-aligned tubular members and a connecting tubular member for connecting the parallel tubular members to each other in a communicating relationship.

6. The method of claim 1 or 2 wherein the synthetic resin is selected from the group consisting of medium-pressure polyethylene, polypropylene and ABS resin.

* * * * *